(12) United States Patent
Unno

(10) Patent No.: US 10,244,141 B2
(45) Date of Patent: Mar. 26, 2019

(54) PRINTING APPARATUS CAPABLE OF ADDING USER INFORMATION AND NUMBER INFORMATION TO PRINT TARGET IMAGE, AND CONTROL METHOD THEREOF

(71) Applicant: CANON KABUSHIKI KAISHA, Tokyo (JP)

(72) Inventor: Koichi Unno, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 15/238,555

(22) Filed: Aug. 16, 2016

(65) Prior Publication Data

US 2017/0064133 A1    Mar. 2, 2017

(30) Foreign Application Priority Data

Aug. 27, 2015    (JP) ................. 2015-168288

(51) Int. Cl.
*H04N 1/32* (2006.01)
*G06K 15/02* (2006.01)

(52) U.S. Cl.
CPC ..... *H04N 1/32133* (2013.01); *G06K 15/1802* (2013.01); *G06K 15/1809* (2013.01); *H04N 2201/0082* (2013.01)

(58) Field of Classification Search
None
See application file for complete search history.

(56) References Cited

U.S. PATENT DOCUMENTS

| 8,159,699 B2 * | 4/2012 | Okada ................. G06F 21/608 358/1.13 |
| 8,335,011 B2 * | 12/2012 | Toda ................... H04N 1/2187 358/1.13 |
| 2003/0112462 A1 * | 6/2003 | Ochiai ................. G06K 15/02 358/1.15 |
| 2010/0142000 A1 * | 6/2010 | Haraguchi ............ G06K 15/02 358/1.18 |

FOREIGN PATENT DOCUMENTS

JP    2005-305671 A    11/2005

OTHER PUBLICATIONS

IBM Knowledge Center discussion titled "Creating Headers and Footers for Printing", dated Oct. 5, 2009.*
Tracker Software Products' Knowledgebase Item titled "How do I use PDF—Tools to add page numbers to documents", dated Aug. 30, 2011.*

* cited by examiner

*Primary Examiner* — Paul F Payer
(74) *Attorney, Agent, or Firm* — Canon U.S.A., Inc. IP Division

(57) ABSTRACT

A printing apparatus capable of adding number information differing from copy set to copy set, to a printing target image includes a judging unit configured to judge whether to add user information indicating a current user to a printing target image, and a determination unit configured to determine a position to which the number information is to be added, based on a result of the judgment performed by the judging unit.

18 Claims, 12 Drawing Sheets

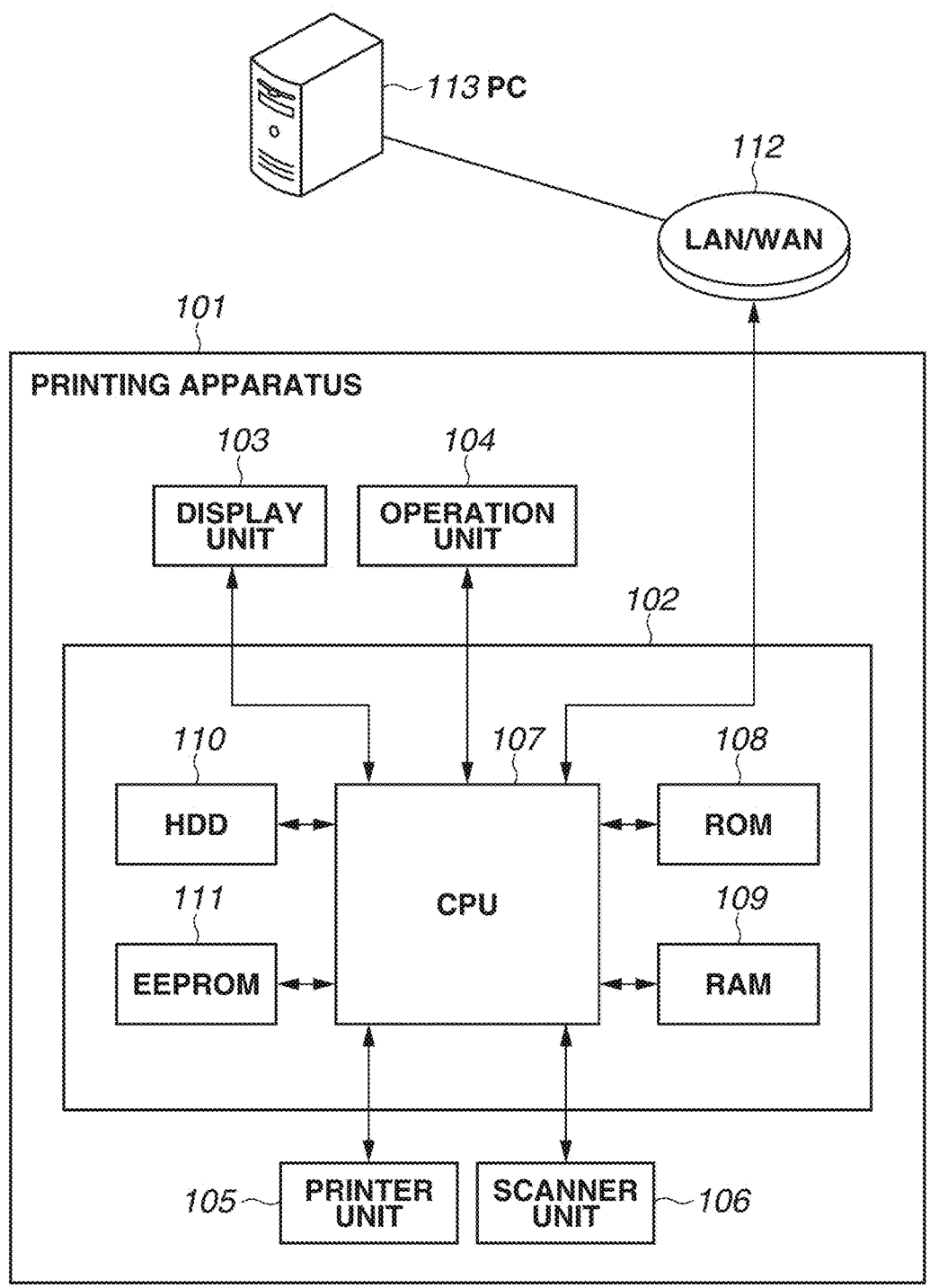

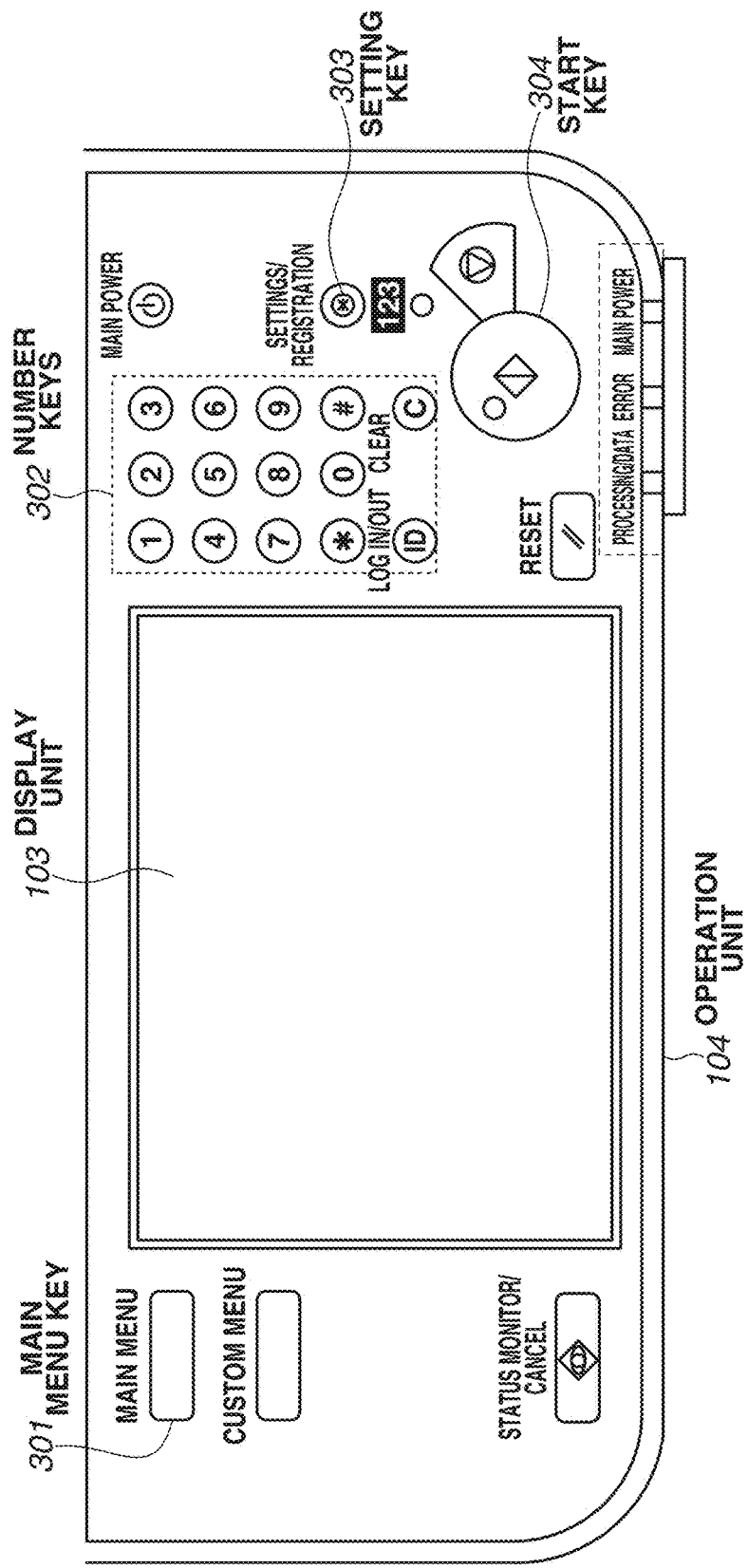

CASE WHERE AREA AT WHICH INFORMATION IS ADDED IS "TOP RIGHT" OR "TOP LEFT"

FIG.11A
IDENTIFICATION INFORMATION PRINTING = OFF
COPY SET NUMBERING = ON

| FIRST LINE | 0001 |
| SECOND LINE | |
| THIRD LINE | |
| FOURTH LINE | |
| FIFTH LINE | |

FIG.11B
IDENTIFICATION INFORMATION PRINTING = ON
COPY SET NUMBERING = OFF

| FIRST LINE | 2015/08/01 |
| SECOND LINE | Suzuki |
| THIRD LINE | 111. 222. 333. 444 |
| FOURTH LINE | SN1234567 |
| FIFTH LINE | |

FIG.11C
IDENTIFICATION INFORMATION PRINTING = ON
COPY SET NUMBERING = ON

| FIRST LINE | 0001 |
| SECOND LINE | 2015/08/01 |
| THIRD LINE | Suzuki |
| FOURTH LINE | 111. 222. 333. 444 |
| FIFTH LINE | SN1234567 |

CASE WHERE AREA AT WHICH INFORMATION IS ADDED IS "BOTTOM RIGHT" OR "BOTTOM LEFT"

FIG.11D
IDENTIFICATION INFORMATION PRINTING = OFF
COPY SET NUMBERING = ON

| FIFTH LINE | |
| FOURTH LINE | |
| THIRD LINE | |
| SECOND LINE | |
| FIRST LINE | 0001 |

FIG.11E
IDENTIFICATION INFORMATION PRINTING = ON
COPY SET NUMBERING = OFF

| FIFTH LINE | |
| FOURTH LINE | 2015/08/01 |
| THIRD LINE | Suzuki |
| SECOND LINE | 111. 222. 333. 444 |
| FIRST LINE | SN1234567 |

FIG.11F
IDENTIFICATION INFORMATION PRINTING = ON
COPY SET NUMBERING = ON

| FIFTH LINE | 0001 |
| FOURTH LINE | 2015/08/01 |
| THIRD LINE | Suzuki |
| SECOND LINE | 111. 222. 333. 444 |
| FIRST LINE | SN1234567 |

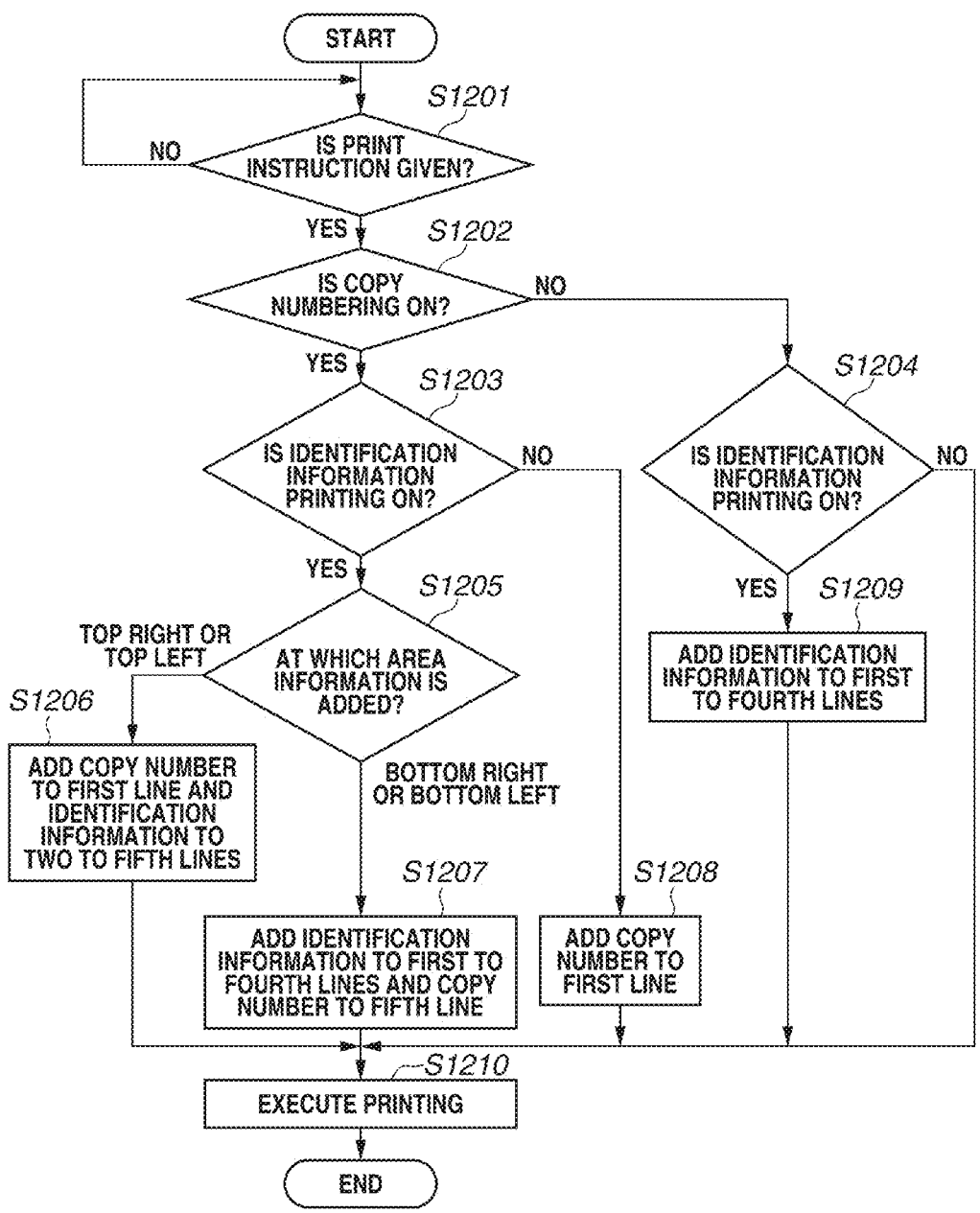

PRINTING APPARATUS CAPABLE OF ADDING USER INFORMATION AND NUMBER INFORMATION TO PRINT TARGET IMAGE, AND CONTROL METHOD THEREOF

BACKGROUND OF THE INVENTION

Field of the Invention

The present invention relates to a printing apparatus capable of adding number information differing from copy set to copy set and user information indicating a current user to a printing target image.

Description of the Related Art

Japanese Patent Application Laid-Open No. 2005-305671 discusses addition of number information differing from copy set to copy set to a printing target image in a case of printing a plurality of sets. When the number information differing from copy set to copy set is added, distributed printed documents can be tracked if a person to whom the printed documents are distributed (e.g., participants of a meeting) is recorded in association with the number of the printed documents.

Meanwhile, in recent years, it is known to add user information indicating a current user (a user having given a printing instruction, a user of a printing apparatus, etc.) to a printing target image. In this way, a person who has printed a printed document can be identified afterward from the printed document.

As described above, "number information differing from copy set to copy set" and "user information indicating a current user" are known as information that can be added to a printing target image, but it is not assumed to add both the number information and the user information, which are added for different purposes, to one image.

In a case of adding the number information and user information to one image, there is a possibility that the number information and the user information are added to the same position. For example, there may be a case where a top right area is selected as an area to which the number information is added and the top right is also selected as an area to which the user information is added, among a plurality of areas including the top right area, a bottom right area, a top left area, and a bottom left area of an image. In such a case, the number information and the user information overlap with each other at a predetermined position within the selected area, making both of the number information and the user information unrecognizable. Especially in a case where a person who is set to add the number information and a person who is set to add the user information are different, for example, a number information addition setting is made by a user of a printing apparatus and a user information addition setting is made by an administrator of the printing apparatus, the possibility increases that the same area is selected as an area to which the number information is added and also as an area to which the user information is added.

SUMMARY OF THE INVENTION

The present invention is directed to adding number information differing from copy set to copy set, and user information indicating a current user, to appropriate positions.

According to an aspect of the present invention, a printing apparatus capable of adding number information differing from copy set to copy set, to a printing target image includes a judging unit configured to judge whether to add user information indicating a current user to a printing target image, and a determination unit configured to determine a position to which the number information is to be added, based on a result of the judgment performed by the judging unit.

Further features of the present invention will become apparent from the following description of exemplary embodiments with reference to the attached drawings.

BRIEF DESCRIPTION OF THE DRAWINGS

FIG. 1 illustrates an entire system including a printing apparatus according to an exemplary embodiment of the present invention.

FIG. 3 is an external view illustrating an operation unit of a printing apparatus according to an exemplary embodiment of the present invention.

FIGS. 11A to 11F each illustrate positions at which identification information and number information are added according to an exemplary embodiment of the present invention.

FIG. 12 is a flow chart illustrating operations of a printing apparatus according to an exemplary embodiment of the present invention.

DESCRIPTION OF THE EMBODIMENTS

Figure 2A:
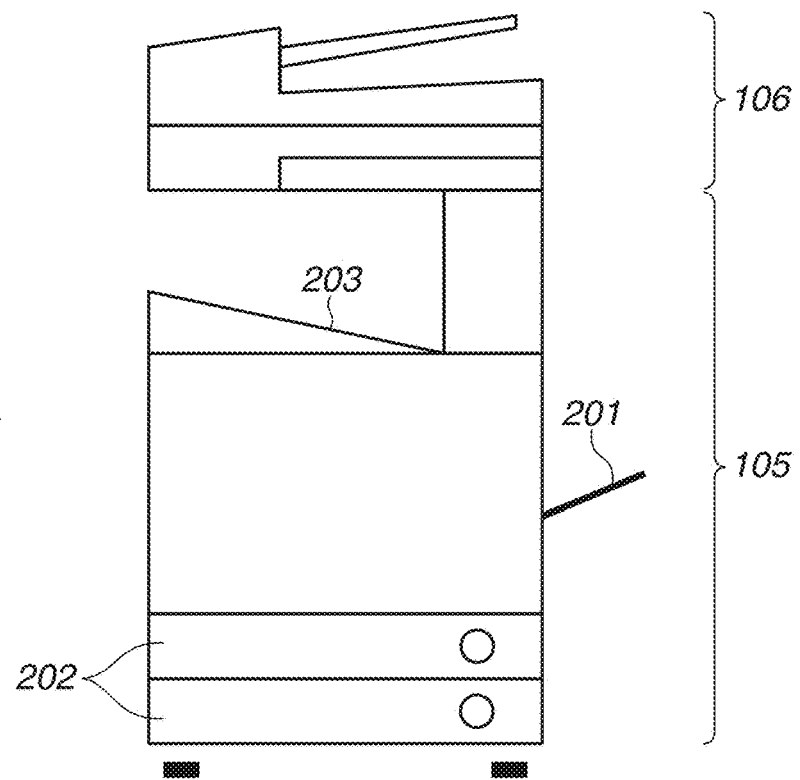
FIG. 2A is an external view illustrating a printing apparatus according to an exemplary embodiment of the present invention.

The following describes a printing apparatus according to an exemplary embodiment of the present invention with reference to the drawings. The exemplary embodiments described below are not intended to limit the scope of the invention. Further, not every combination of features described in the exemplary embodiments is always required for a technical solution of the invention.

FIG. 1 illustrates an entire system including a printing apparatus 101, which is an example of a printing apparatus to which an exemplary embodiment of the present invention is applied. The printing apparatus 101 includes a controller unit 102, a display unit 103, an operation unit 104, a printer unit 105, and a scanner unit 106. The display unit 103 includes a light emitting diode (LED) and a liquid crystal display and displays details of user operations and an internal state of the printing apparatus 101. The operation unit 104 receives user operations via a hard key group or a touch panel function of the display unit 103.

The printer unit 105 receives a printing instruction from the controller unit 102 and prints an image on a sheet based on image data transmitted from the controller unit 102. The scanner unit 106 receives a reading instruction from the controller unit 102, reads an image on a document, and transmits acquired image data to the controller unit 102. The printer unit 105 may perform printing (copy job) also based on image data generated by the scanner unit 106.

The controller unit 102 includes a central processing unit (CPU) 107, a read-only memory (ROM) 108, a random access memory (RAM) 109, a hard disk drive (HDD) 110, and an electrically erasable programmable ROM (EE-PROM) 111. The CPU 107 is a medium configured to execute a control program installed in the printing apparatus 101 and controls operations of devices connected to the controller unit 102 via an interface (I/F), a memory of a storage medium, etc. The ROM 108 is a read-only memory and stores a boot program needed for activation of the system, etc. The RAM 109 is a volatile memory and is used as a work memory at the time of execution of a control program.

The HDD 110 is a storage medium such as a magnetic disk and stores a control program, image data, etc. The EEPROM 111 is a non-volatile memory and stores a set value, etc. needed at the time of execution of a control program.

The CPU 107 receives page description language (PDL) data from a personal computer (PC) 113, which is an external apparatus, via a local area network/wide area network (LAN/WAN) 112 and can cause the printer unit 105 to execute printing (PDL job) based on the received PDL data. The PDL data is generated by a printer driver installed in the PC 113, which is a host computer.

FIG. 2A is an external view illustrating the printing apparatus 101. A lower part of a housing of the printing apparatus 101 corresponds to the printer unit 105, and an upper part of the housing corresponds to the scanner unit 106. A manual feeding tray 201 and a cassette 202 are provided as sheet feeding sources of sheets to be used for printing. Further, a sheet discharging tray 203 is provided as a discharge destination to which a sheet with an image printed thereon is discharged.

Figure 2B:
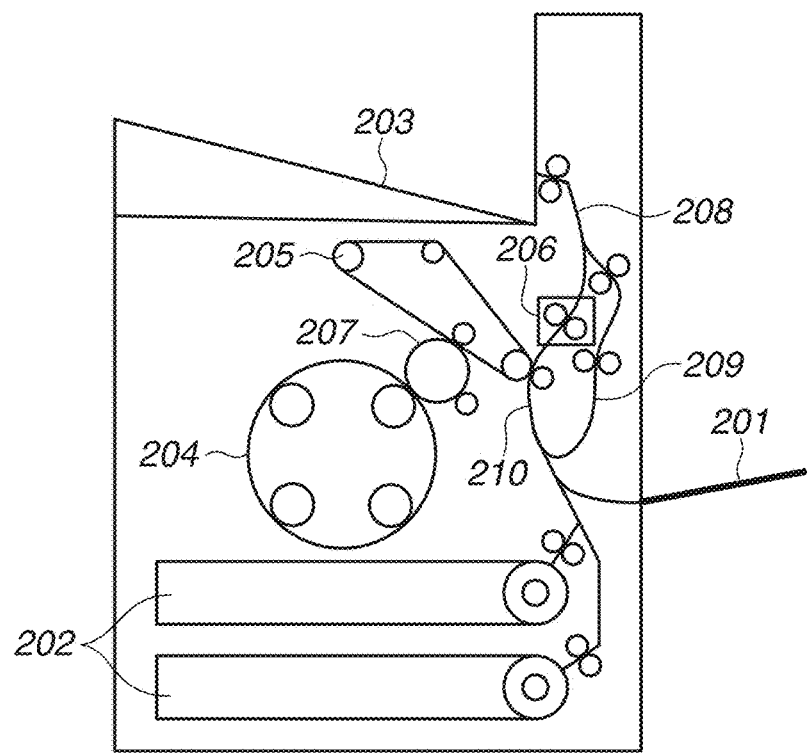
FIG. 2B illustrates a conveying path.

FIG. 2B illustrates a sheet conveying path in the printer unit 105. After having undergone charging processing to have a specific polar potential, a photosensitive drum 207 is exposed to light by an exposure unit (not illustrated). In this way, an electrostatic latent image is formed on the photosensitive drum 207. Thereafter, toner is attached to the photosensitive drum 207 by use of a development unit 204 to develop the image.

The image developed on the photosensitive drum 207 is transferred onto an intermediate transfer belt 205 and then transferred onto a sheet conveyed from the manual feeding tray 201 or the cassette 202 to a conveying path 210. The sheet onto which the image is transferred is conveyed to a fixing unit 206 and undergoes fixing processing with heat and pressure. In a case of one-sided printing, the fixed sheet is conveyed through a conveying path 208 and then discharged to the sheet discharging tray 203 with the printed surface facing downward. In a case of two-sided printing, the fixed sheet is flipped over on the conveying path 208, conveyed through a conveying path 209, and fed again to the conveying path 210. In the two-sided printing, a back side of a sheet is printed first, and the sheet is discharged with a front surface facing downward.

FIG. 3 is an external view illustrating the operation unit 104 including the display unit 103. A main menu key 301 is a key for displaying a main menu (FIG. 4A) on the display unit 103. Number keys 302 are keys with which a user inputs a numerical value (e.g., printing starting number described below). A setting key 303 is a key that is pressed to set various settings with respect to the entire printing apparatus 101. A start key 304 is a key that is pressed to give an instruction to execute processing such as printing processing, etc.

Figure 4A:
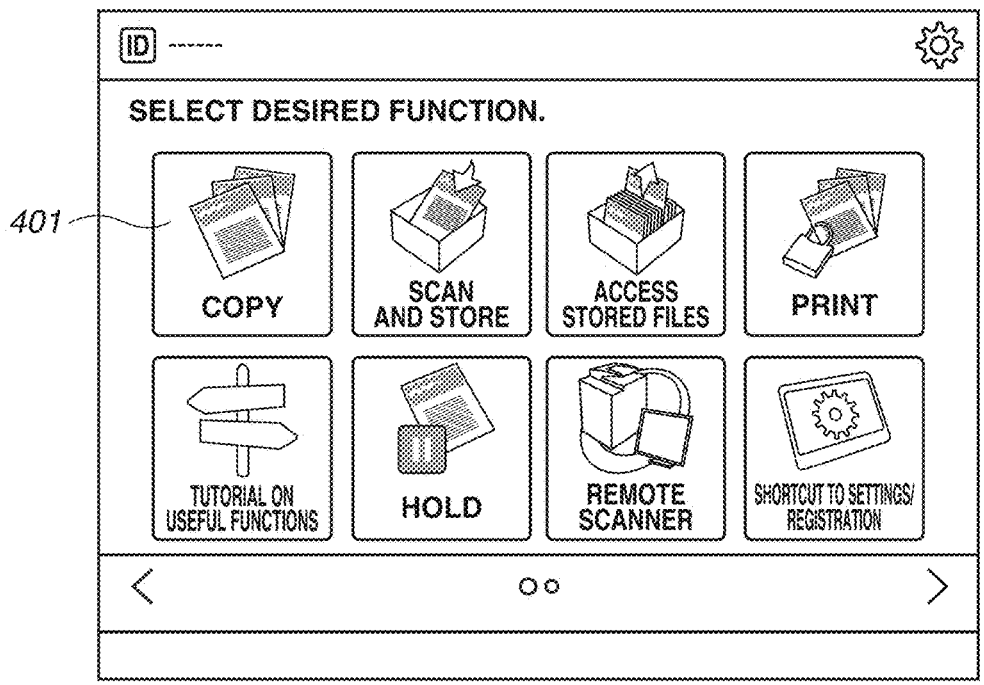
FIGS. 4A and 4B each illustrate an example of a screen displayed on a display unit of a printing apparatus according to an exemplary embodiment of the present invention.
Figure 4B:
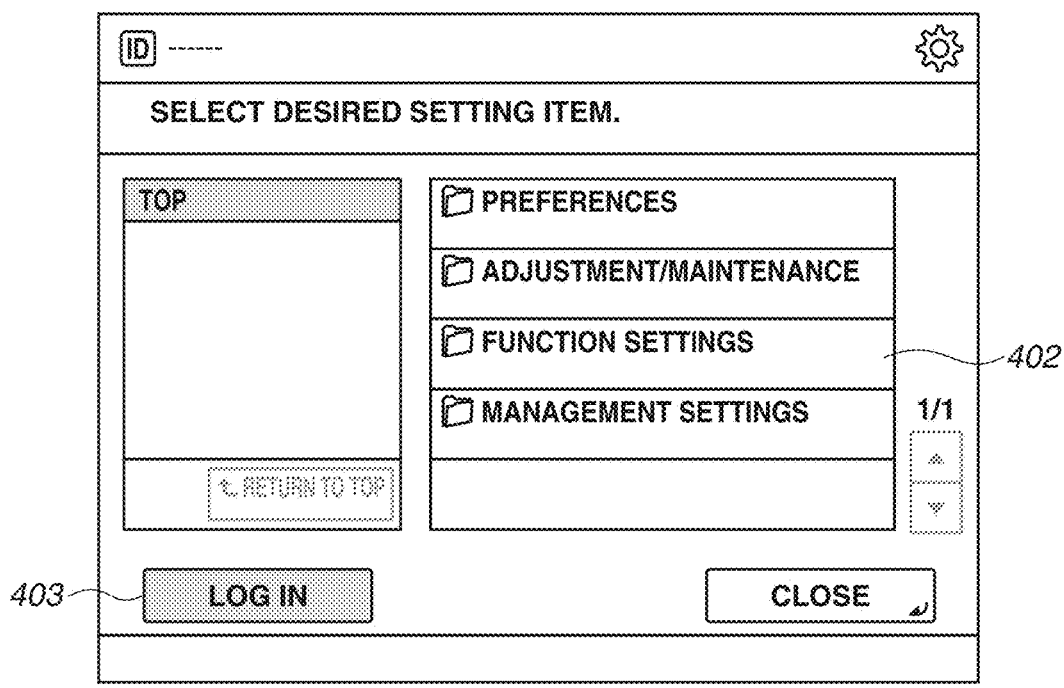

FIG. 4A is an operation screen that is displayed on the display unit 103 when the main menu key 301 is pressed. As illustrated in FIG. 4A, the printing apparatus 101 includes a plurality of functions such as "copy", "print", etc. FIG. 4B is an operation screen that is displayed on the display unit 103 when the setting key 303 is pressed. A user can set various settings via a screen shifted from the above operation screen.

Figure 5A:
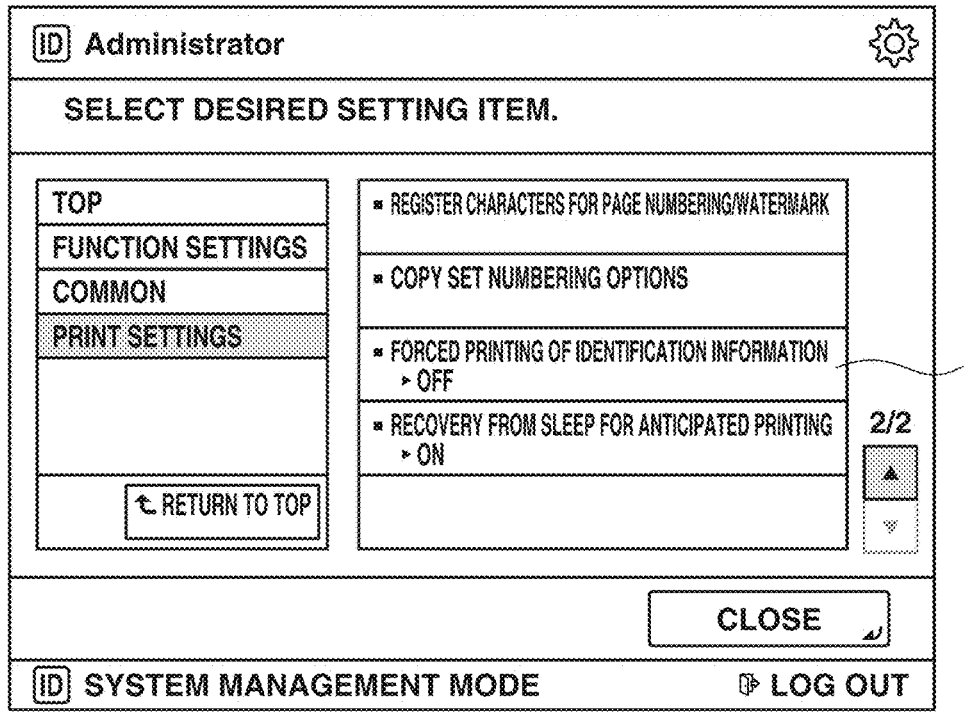
FIGS. 5A and 5B each illustrate an example of a screen displayed on a display unit of a printing apparatus according to an exemplary embodiment of the present invention.

FIG. 5A is an operation screen that is displayed on the display unit 103 in a case where an item 402 with the name "Function settings" is selected on the operation screen illustrated in FIG. 4B. The operation screen illustrated in FIG. 5A includes an item 501 "Forced printing of identification information". The item 501 is an item that can be set only by an administrator of the printing apparatus 101, therefore when a general user is operating the apparatus, the item 501 is grayed out. To set the item 501, a user needs to press a log-in key 403 illustrated in FIG. 4B to be authenticated as an administrator.

Figure 5B:
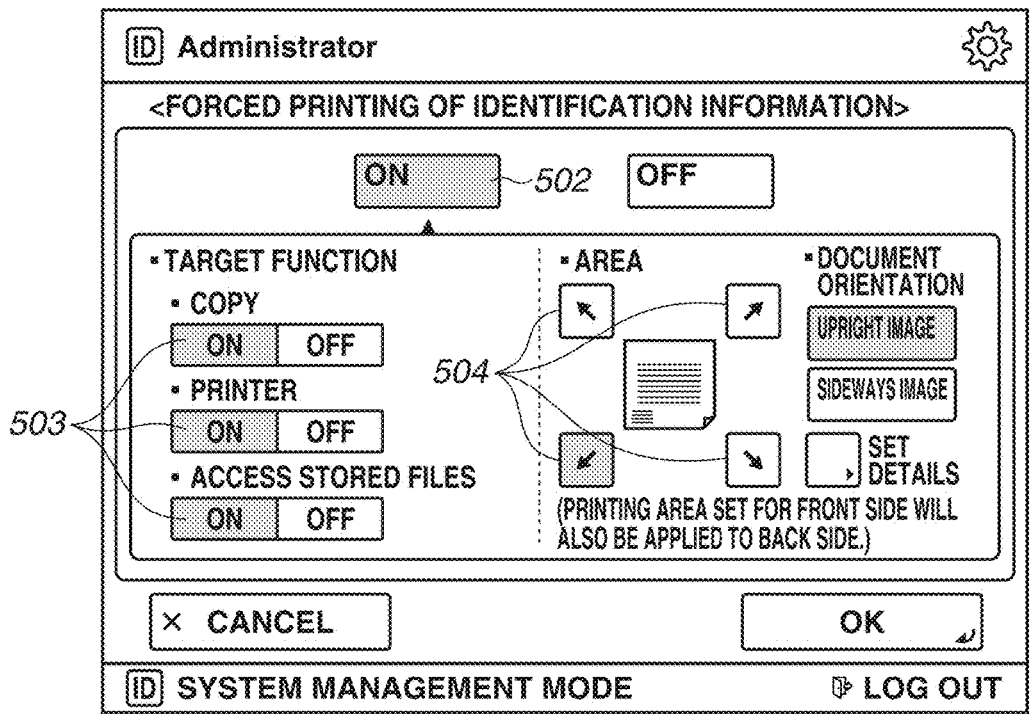

FIG. 5B is an operation screen that is displayed on the display unit 103 in a case where the item 501 illustrated in FIG. 5A is selected. On the operation screen illustrated in FIG. 5B, settings relating to the forced printing of identification information can be made. The identification information herein contains user information indicating a current user (a user having given a printing instruction, a user of the printing apparatus 101, etc.) and also contains the printing date/time, an Internet protocol (IP) address of the printing apparatus 101, further a serial number of the printing apparatus 101, besides the user information. The user information indicating the current user is forcibly added (printed) so that the person who printed the printed document can be identified afterward from the printed document. In a case of execution of a copy job, the user (user of the printing apparatus 101) specified by the user information is a user having logged in to the printing apparatus 101. Further, in a case of execution of a PDL job, the user specified by the user information is a user having logged in to the PC 113, which is a host computer.

In a case where printing of identification information is carried out, an ON key 502 is pressed. Keys 503 are keys for setting whether to print identification information for each function. Keys 504 are keys (area selection keys) for selecting an area in which identification information is to be printed. The areas in which identification information can be printed are the following four areas: a top right area, a bottom right area, a top left area, and a bottom left area of an image.

Figure 6A:
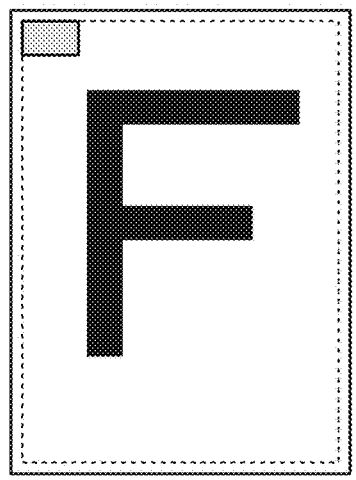
FIGS. 6A, 6B, 6C, and 6D each illustrate an area at which identification information can be added according to an exemplary embodiment.
Figure 6B:
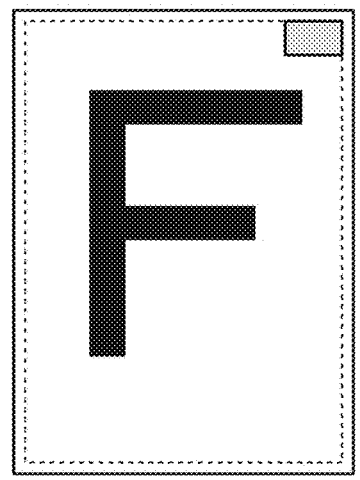
Figure 6C:
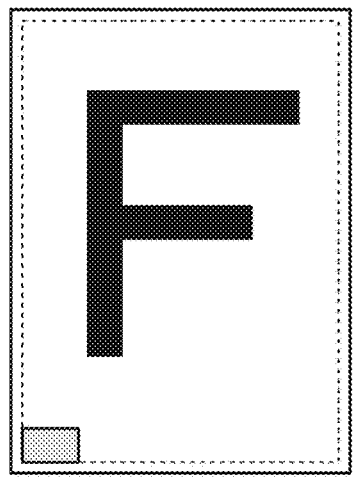
Figure 6D:
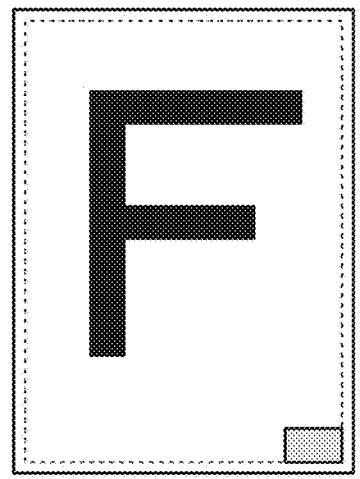

FIGS. 6A to 6D each illustrate a state in which identification information is added to an image. FIG. 6A illustrates a case where the top left area is selected as an area to which identification information is added. A solid line in FIG. 6A indicates a sheet edge, and a dotted line in FIG. 6A indicates an image printable area. In a case of adding identification information to the top left area, a top left point of a rectangle having a size corresponding to information that is added is positioned to coincide with a top left point of the printable area. The rectangle may be positioned slightly inside apart from an edge of the printable area with a margin, further the width of the margin may be settable by the user. Similarly, FIGS. 6B, 6C, and 6D illustrate cases where the top right area, the bottom left area, and the bottom right area are selected, respectively, as an area to which identification information is added.

Figure 7A:
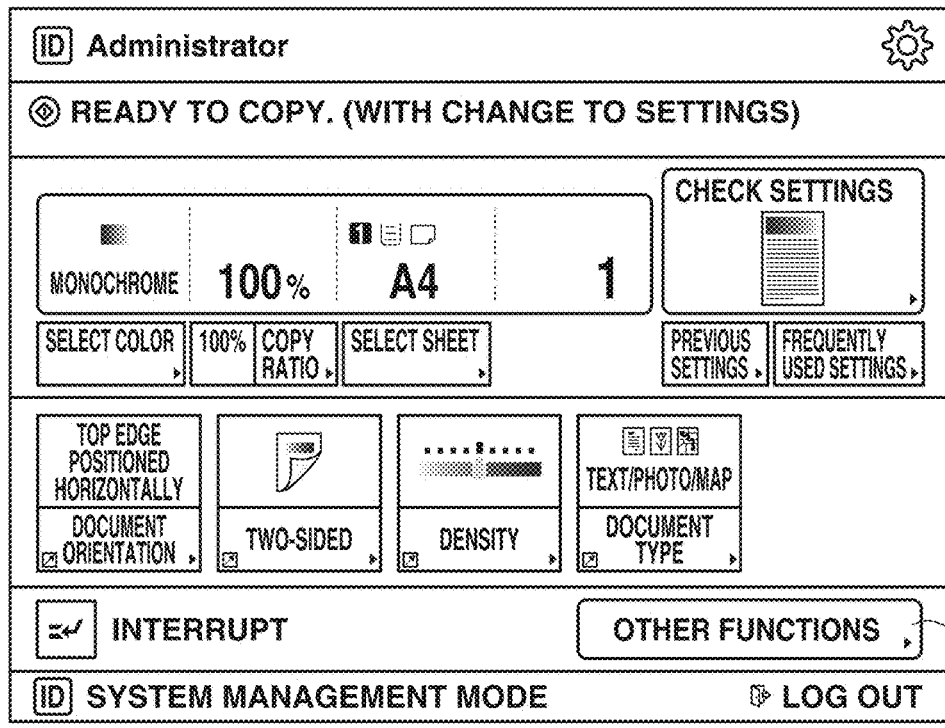
FIGS. 7A and 7B each illustrate an example of a screen displayed on a display unit of a printing apparatus according to an exemplary embodiment of the present invention.

FIG. 7A is an operation screen that is displayed on the display unit 103 in a case where a copy key 401 is pressed on the operation screen illustrated in FIG. 4A. On the operation screen, a user wishing to execute a copy job can make various settings (selection of color/monochrome, selection of one-side/two-side, number of copy sets, density, etc.) relating to the copy job. Details of settings that are made on the screen are cleared at the press of the main menu key 301 or the setting key 303.

Figure 7B:
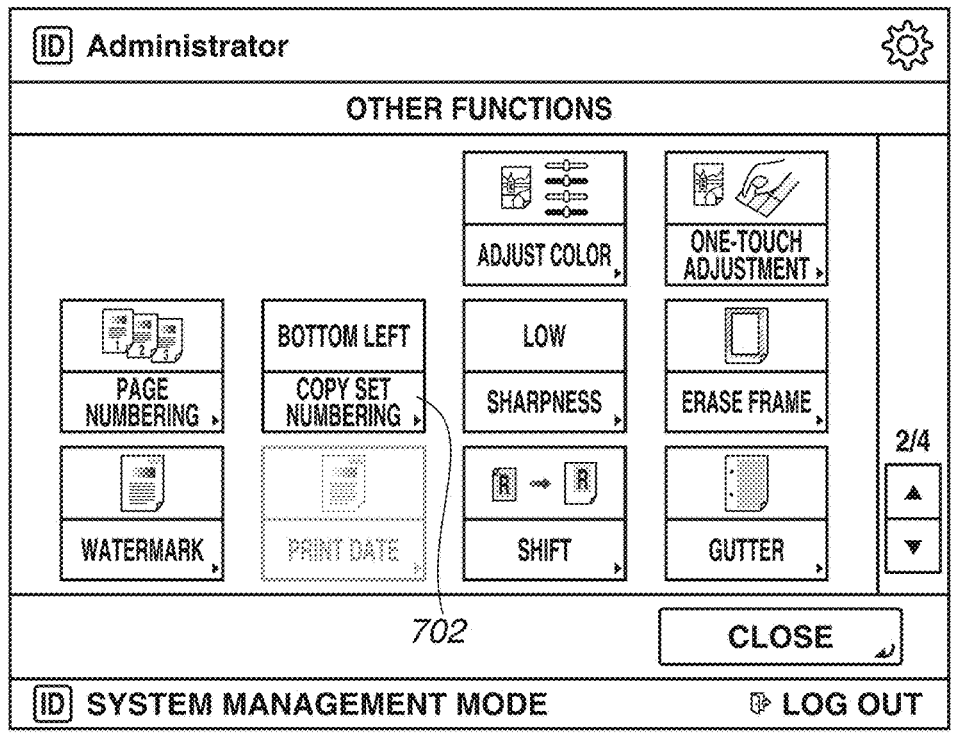

FIG. 7B is an operation screen that is displayed on the display unit 103 in a case where an "Other functions" key 701 is pressed on the operation screen illustrated in FIG. 7A. The operation screen includes a copy set numbering key 702 for copy set numbering. The copy set numbering is a function of adding number information differing from copy set to copy set, to a printing target image in a case of printing a plurality of copy sets. By adding the number information differing for each set, distributed printed documents can be tracked if persons to whom the printed documents are distributed (e.g., participants of a meeting) are recorded in association with numbers of the printed documents.

Figure 8A:
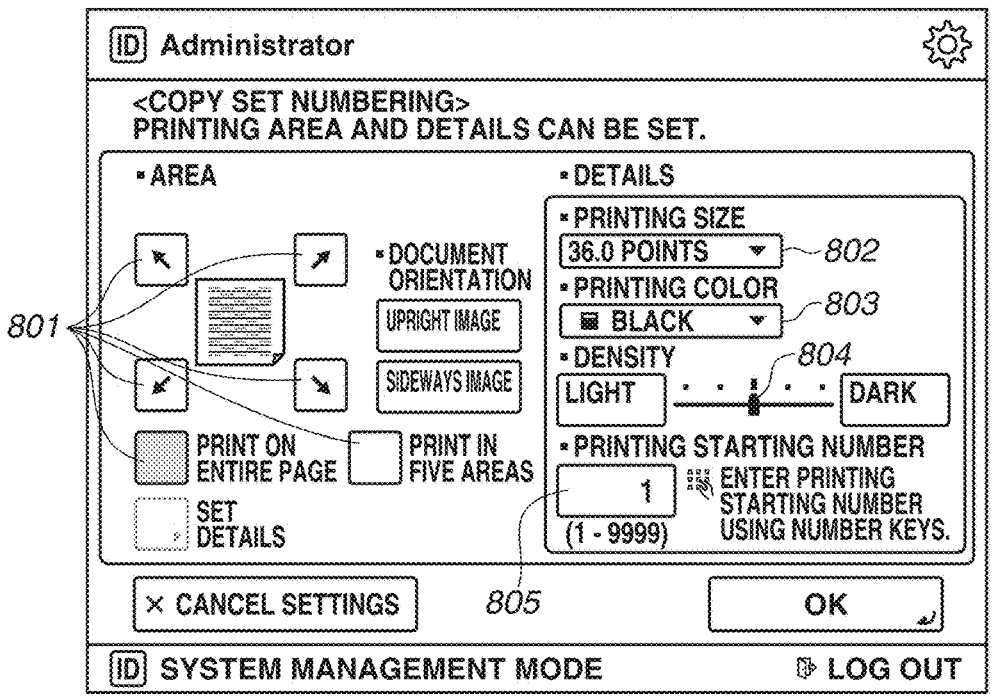
FIGS. 8A and 8B each illustrate an example of a screen displayed on a display unit of a printing apparatus according to an exemplary embodiment of the present invention.
Figure 8B:
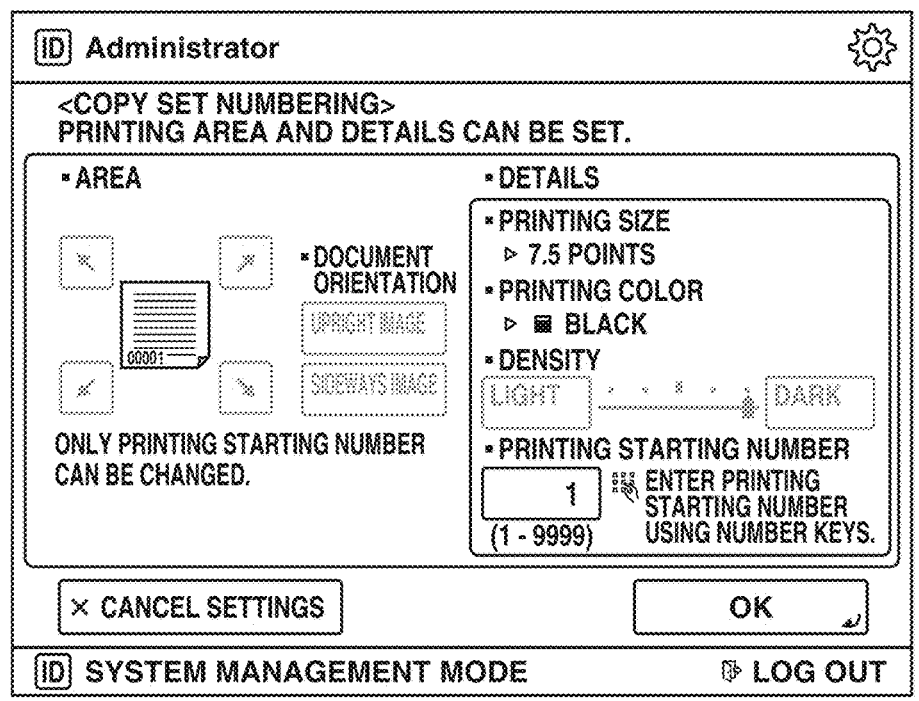

FIGS. 8A and 8B each illustrate an operation screen that is displayed on the display unit 103 in a case where the copy set numbering key 702 is pressed on the operation screen illustrated in FIG. 7B. In FIG. 8A, keys 801 are keys (area selection keys) for selecting an area in which number information is to be printed. Number information is printable in the following six areas in total: "five areas" and "entire page" in addition to the four areas of an image that are the top right area, the bottom right area, the top left area, and the bottom left area.

In items 802 to 804 (character attribute selection keys), character attributes of number information that is to be printed can be selected. Specifically, in the item 802, the size of number information can be selected. In the item 803, the character color of number information can be selected. In the item 804, the density of number information can be selected. In an item 805, a printing starting number is entered. For example, in a case where "101" is entered in the item 805, "00101" is added to the first set of printed document and "00102" to the second set of printed document.

Figure 9A:
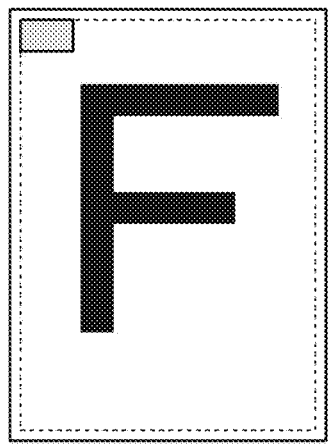
FIGS. 9A to 9F each illustrate an area at which number information can be added according to an exemplary embodiment of the present invention.
Figure 9B:
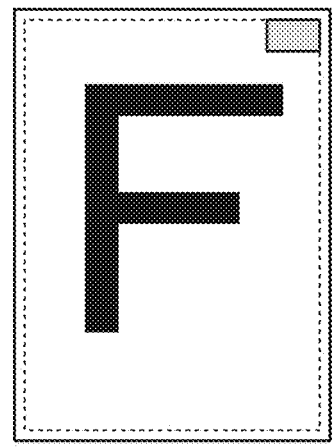
Figure 9C:
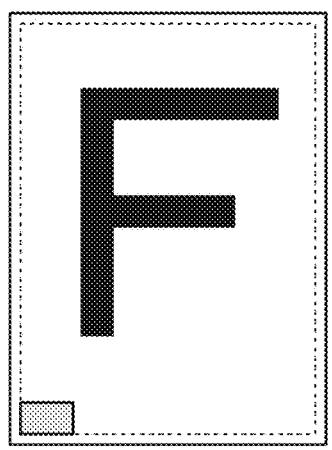
Figure 9D:
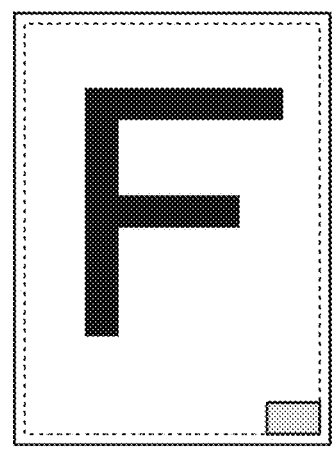

FIGS. 9A to 9F each illustrate a state in which the number information is added to an image. FIG. 9A illustrates a case where the top left area is selected as an area to which number information is added. As in FIGS. 6A to 6D, a solid line in FIG. 9A indicates a sheet edge, and a dotted line in FIG. 9A indicates an image printable area. In a case of adding the number information to the top left area, a top left point of a rectangle having a size corresponding to information that is to be added is positioned to coincide with a top left point of the printable area. The rectangle may be positioned slightly inside apart from an edge of the printable area with a margin, and the width of the margin may be settable by the user. Similarly, FIGS. 9B, 9C, and 9D illustrate cases where the top right area, the bottom left area, and the bottom right area are selected respectively, as an area to which number information is to be added.

Figure 9E:
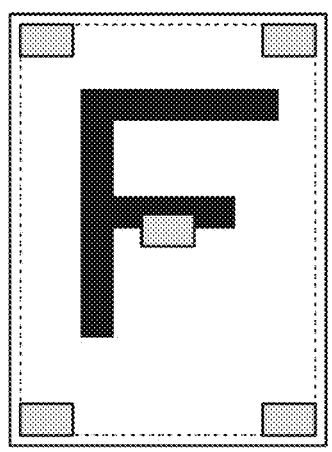
Figure 9F:
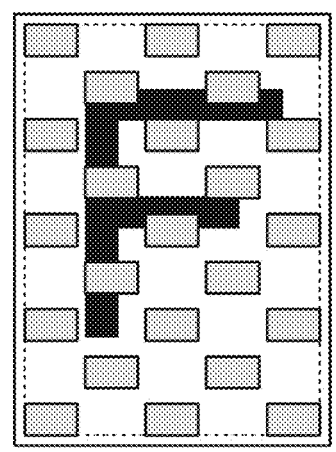

In the copy set numbering function, "five areas" and "entire page", which are not chosen in printing the identification information, are selectable as an area to which number information is added. FIG. 9E illustrates a case where "five areas" is selected as an area to which number information is added. In the case where "five areas" is selected, the number information is added to the four areas that are the top right area, the bottom right area, the top left area, and the bottom left area and in addition to a central area. FIG. 9F illustrates a case where "entire page" is selected as an area to which the number information is added. In the case where "entire page" is selected, many pieces of number information are added across the entire printable area.

Meanwhile, in the copy set numbering function, an area to which number information is added and character attributes of the number information are selectable. However, in a case where the printing of identification information described above is on, an area to which the number information is added, and character attributes of the number information are not selectable, because if addition of the number information and addition of the identification information can be set independently of each other, there may be a possibility that the number information and the identification information are set and added to the same area and therefore printed in an overlapping position.

Hence, in a case where the printing of identification information is on, the printing apparatus 101 purposefully fixes an area to which the number information is added and which is the same as an area to which the identification information is added, and also fixes the character attributes of number information on the same attributes as the identification information. Then, as described below with reference to FIGS. 11A to 11F, the position to which the number information or identification information is added is dynamically changed within the area, so that the number information and the identification information are prevented from overlapping with each other and can be added in a nice looking manner.

Figure 10:
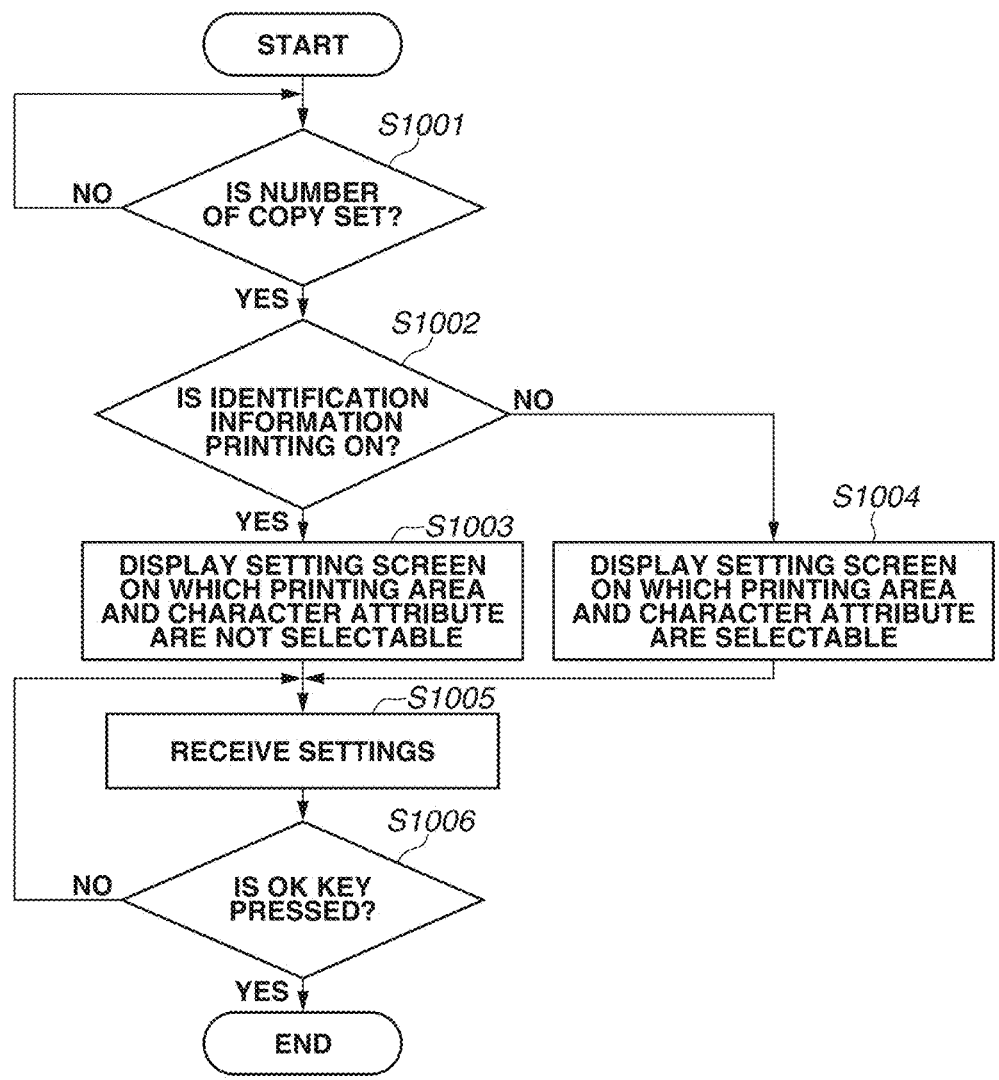
FIG. 10 is a flow chart illustrating operations of a printing apparatus according to an exemplary embodiment of the present invention.

FIG. 10 is a flow chart illustrating copy set numbering operations. The CPU 107 of the printing apparatus 101 executes a control program stored in the ROM 108 to realize each operation (step) specified in the flow chart in FIG. 10.

In step S1001, whether a copy set numbering instruction is given is determined. In the present invention, if the copy set numbering key 702 illustrated in FIG. 7B is pressed, it is determined that the copy set numbering instruction is given (YES in step S1001), and the processing proceeds to step S1002.

In step S1002, whether identification information printing is on is determined. This determination is made by referring to information that is set via the screen illustrated in FIG. 5B and stored in the EEPROM 111. If identification information printing is not on (NO in step S1002), the processing proceeds to step S1004, and a screen (FIG. 8A) on which a printing area and a character attribute are selectable is displayed. On the other hand, if the identification information printing is on (YES in step S1002), the processing proceeds to step S1003, and a screen (FIG. 8B) on which the printing area and the character attribute are not selectable is displayed. While the printing area and the character attribute are not selectable on the screen in the present exemplary embodiment, a screen similar to the screen displayed in step S1004 may be displayed in step S1003 and a setting error may be displayed when the OK key is pressed.

In step S1005, settings via the screen illustrated in FIG. 8A or 8B are received. Then, in step S1006, if it is determined that the OK key is pressed (YES in step S1006), the processing is ended.

FIGS. 11A to 11F illustrate in detail the positions of information (identification information and number information described above) to be added to an image. FIGS. 11A to 11C each illustrate the case where an area to which information is added is the top right area or the top left area, and FIGS. 11D to 11F each illustrate the case where an area to which information is added is the bottom right area or the bottom left area. In the case where an area to which information is added is the top right area or the top left area, the lines are counted from the top, i.e., the first line, the second line . . . from above. In the case where an area to which information is added is the bottom right area or the bottom left area, the lines are counted from the bottom, i.e., the first line, the second line . . . from underneath.

FIG. 11A illustrates a case where the identification information printing is off and the copy set numbering is on. In this case, the number information is added to the first line. FIG. 11B illustrates a case where the identification information printing is on and the copy set numbering is off. In this case, the identification information is added to the first to fourth lines. FIG. 11C illustrates a case where the identification information printing is on and the copy set numbering is also on. In this case, the number information is added to the first line, and identification information is added to the second to fifth lines.

A comparison between FIGS. 11B and 11C shows that the position to which the identification information is added is determined (changed) based on whether the number information is to be added. In this way, the number information and identification information are prevented from overlapping with each other in the same position in the case where the area to which the number information and the identification information are added is the top right area or the top left area.

FIG. 11D illustrates a case where the identification information printing is off and the copy set numbering is on. In this case, the number information is added to the first line. FIG. 11E illustrates a case where the identification information printing is on and the copy set numbering is off. In this case, the identification information is added to the first to fourth lines. FIG. 11F illustrates a case where the identification information printing is on and the copy set numbering is also on. In this case, the identification information is added to the first to fourth lines, and the number information is added to the fifth line.

A comparison between FIGS. 11D and 11F shows that the position to which number information is added is determined (changed) based on whether the identification information is to be added. In this way, number information and identification information are prevented from overlapping with each other in the same position in the case where the area to which the number information and the identification information are added is the bottom right area or the bottom left area.

FIG. 12 is a flow chart illustrating operations that are performed in a case where a print execution instruction is given. The CPU 107 of the printing apparatus 101 executes a control program stored in the ROM 108 to realize each operation (step) specified in the flow chart in FIG. 12.

In step S1201, whether a print execution instruction is given is determined. In the present exemplary embodiment, if the start key 304 is pressed, it is determined that the print execution instruction is given (YES in step S1201), and the processing proceeds to step S1202. In step S1202, whether copy set numbering is on is determined. This determination is performed by referring to information that is set via the screen illustrated in FIG. 8A or 8B and stored in the EEPROM 111. If the copy set numbering is on (YES in step S1202), the processing proceeds to step S1203. On the other hand, if the copy set numbering is not on (if copy set numbering is off) (NO in step S1202), the processing proceeds to step S1204.

In step S1203, whether identification information printing is on is determined. This determination is performed by referring to information that is set via the screen illustrated in FIG. 5B and stored in the EEPROM 111. If the identification information printing is on (YES in step S1203), the processing proceeds to step S1205. On the other hand, if the identification information printing is not on (if the identification information printing is off) (NO in step S1203), the processing proceeds to step S1208.

In step S1205, an area to which the identification information and number information are added is determined. As described above, in the case where both identification information and number information are to be added, the identification information and the number information are added to the same area. If the area to which the identification information and number information are to be added is the top right area or the top left area (TOP RIGHT OR TOP LEFT in step S1205), the processing proceeds to step S1206. On the other hand, if the area to which the identification information and number information are to be added is the bottom right area or the bottom left area (BOTTOM RIGHT OR BOTTOM LEFT in step S1205), the processing proceeds to step S1207.

In step S1206, the number information is added to the first line and the identification information to the second to fifth lines in a predetermined area in the top right area or the top left area of the image, as illustrated in FIG. 11C. In step S1207, the identification information is added to the first to fourth lines and the number information to the fifth line in a predetermined area in the bottom right area or the bottom left area of the image, as illustrated in FIG. 11F.

In step S1208, the number information is added to the first line in a predetermined area in the top right area, the top left area, the bottom right area, or the bottom left area of the image, as illustrated in FIG. 11A or 11D.

In step S1204, whether the identification information printing is on is determined. This determination is performed by referring to information that is set via the screen illustrated in FIG. 5B and stored in the EEPROM 111, as in step S1203. If the identification information printing is on (YES in step S1204), the processing proceeds to step S1209, and the identification information is added to the first to fourth lines in a predetermined area in the top right area, the top left area, the bottom right area, or the bottom left area of the image, as illustrated in FIG. 11B or 11E. As a result of the determination in step S1204, if it is determined that the identification information printing is not on (NO in step S1204), neither the identification information and nor the number information is added, and the processing proceeds to step S1210.

In step S1210, an image to which the identification information and/or number information are/is added or an image to which neither the identification information nor the number information is added is printed. If a plurality of pages is printed, the processing returns to step S1202 after step S1210 to repeat the processing.

While the case of a copy job is described in the present exemplary embodiment, an exemplary embodiment of the present invention is applicable also to a case where a PDL job is executed. In the case of execution of a PDL job, an operation screen corresponding to the screen illustrated in FIG. 8A or 8B is displayed on the PC 113 side, and the settings are made on the PC 113 side by the user.

As the foregoing describes, the printing apparatus 101 determines whether to add the identification information (user information indicating a current user) to a printing target image, and based on a result of the determination, the printing apparatus 101 determines a position to which the number information differing from copy set to copy set is added. Further, the printing apparatus 101 determines whether to add the number information differing from copy set to copy set, to a printing target image, and based on a result of the determination, the printing apparatus 101 determines a position to which user information indicating a current user is added. In this way, the number information differing from copy set to copy set and the user information indicating the current user can be added to appropriate positions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168288, filed Aug. 27, 2015, which is hereby incorporated by reference herein in its entirety.

What is claimed is:

1. A printing apparatus capable of adding number information differing from copy set to copy set, to a printing target image, the printing apparatus comprising:
    a judging unit configured to judge whether to add user information indicating a current user to a printing target image;
    a determination unit configured to determine a position to which the number information is to be added, based on the judgment about whether or not to add the user information indicating the current user to the printing target image;
    a first setting unit configured to set whether to add the number information; and
    a second setting unit configured to set whether to add the user information,
    wherein the setting by the first setting unit and the setting by the second setting unit are configurable by users different from each other of the printing apparatus.

2. The printing apparatus according to claim 1, wherein the setting by the first setting unit is made by a user of the printing apparatus, and the setting by the second setting unit is made by an administrator of the printing apparatus.

3. The printing apparatus according to claim 1, wherein the user information is information that specifies a user of the printing apparatus.

4. The printing apparatus according to claim 1, wherein an area to which the user information is added or an area to which the number information is added is selectable from a plurality of areas including at least a top right area, a bottom right area, a top left area, and a bottom left area of an image, and the determination unit determines a position within a selected area.

5. The printing apparatus according to claim 4, further comprising:
    a first area selecting unit configured to select an area to which the user information is to be added; and
    a second area selecting unit configured to select an area to which the number information is to be added,
    wherein in a case where an area to which the user information is to be added is selected by the first area selecting unit, the second area selecting unit selects the area selected by the first area selecting unit as an area to which the number information is to be added.

6. The printing apparatus according to claim 1, further comprising:
    a first character attribute selecting unit configured to select a character attribute of the user information; and
    a second character attribute selecting unit configured to select a character attribute of the number information,
    wherein in a case where a character attribute of the user information is selected by the first character attribute selecting unit, the second character attribute selecting unit selects the character attribute selected by the first character attribute selecting unit as a character attribute of the number information.

7. The printing apparatus according to claim 6, wherein the character attribute includes a character size or a character color.

8. A printing apparatus capable of adding user information indicating a current user to a printing target image, the printing apparatus comprising:
    a judging unit configured to judge whether to add number information differing from copy set to copy set, to a printing target image;
    a determination unit configured to determine a position to which the user information is to be added, based on the judgment about whether or not to add the number information differing from copy set to copy set to the printing target image;
    a first setting unit configured to set whether to add the number information; and
    a second setting unit configured to set whether to add the user information, wherein the setting by the first setting unit and the setting by the second setting unit are configurable by users different from each other of the printing apparatus.

9. The printing apparatus according to claim 8 wherein the setting by the first setting unit is made by a user of the printing apparatus, and the setting by the second setting unit is made by an administrator of the printing apparatus.

10. A method of controlling a printing apparatus capable of adding number information differing from copy set to copy set, to a printing target image, the method comprising:

judging whether to add user information indicating a current user to a printing target image;

determining a position to which the number information is to be added, based on the judging about whether or not to add the user information indicating the current user to the printing target image;

setting whether to add the number information; and setting whether to add the user information, wherein the setting whether to add the number information is configurable by a user of the printing apparatus, and the setting whether to add the user information is configurable by an administrator of the printing apparatus.

11. A method of controlling a printing apparatus capable of adding user information indicating a current user to a printing target image, the method comprising:

judging whether to add number information differing from copy set to copy set, to a printing target image;

determining a position to which the user information is to be added, based on the judging about whether or not to add the number information differing from copy set to copy set to the printing target image;

setting whether to add the number information; and setting whether to add the user information, wherein the setting whether to add the number information is configurable by a user of the printing apparatus, and the setting whether to add the user information is configurable by an administrator of the printing apparatus.

12. A printing apparatus which prints an image, comprising:

a first setting receiving unit configured to receive, from an administrator of the printing apparatus, setting to print user identification information of a current user of the printing apparatus;

a second setting receiving unit configured to receive, from a current user of the printing apparatus, setting to print predetermined information; and a print unit configured to print the user identification information of the current user of the printing apparatus, the predetermined information, and the image on a sheet on a basis of the setting received from the administrator by the first setting receiving unit and the setting received from the current user by the second setting receiving unit, wherein the user identification information of the current user of the printing apparatus and the predetermined information printed by the printing unit do not overlap with each other.

13. The printing apparatus according to claim 12, wherein the first setting receiving unit further receives, from the administrator, specifying of a print area of the user identification information, and wherein the print unit prints, on the sheet, the user identification information of the current user and the predetermined information in such a way as not to overlap with each other inside the print area specified by the administrator.

14. The printing apparatus according to claim 12, further comprising:

a connecting unit configured to connect the user identification information of the current user of the printing apparatus and the predetermined information to each other on a basis of the setting received from the administrator by the first setting receiving unit and the setting received from the current user by the second setting receiving unit, wherein the print unit prints, on the sheet, the user identification information and the predetermined information connected to each other, and the image.

15. The printing apparatus according to claim 12, wherein a relation in relative position between a print position of the user identification information and a print position of the predetermined information varies in accordance with a position of, on the sheet, an area where the user identification information and the predetermined information are printed.

16. The printing apparatus according to claim 12, wherein the user identification information is information used for identifying the current user who instructed for printing the image.

17. The printing apparatus according to claim 16, wherein the user identification information is a user name of the current user who instructed for printing the image, a print date of the image, an IP address of the printing apparatus, or a serial number of the printing apparatus.

18. The printing apparatus according to claim 12, wherein the predetermined information is number that differs from copy to copy of plural copies of a printed document.

* * * * *